United States Patent [19]

Spies

[11] 4,260,205

[45] Apr. 7, 1981

[54] GAS BEARING

[75] Inventor: Alfons Spies, Seebruck, Fed. Rep. of Germany

[73] Assignee: Dr. Johannes Heidenhain GmbH, Traunreut, Fed. Rep. of Germany

[21] Appl. No.: 48,399

[22] Filed: Jun. 14, 1979

[30] Foreign Application Priority Data

Jun. 24, 1978 [DE] Fed. Rep. of Germany ....... 2827880

[51] Int. Cl.³ ........................ F16C 17/10; F16C 32/06
[52] U.S. Cl. ...................................... 308/9; 308/160; 308/DIG. 1
[58] Field of Search ....................... 308/9, 73, 78, 122, 308/160, 168, 170, DIG. 1, DIG. 15

[56] References Cited

U.S. PATENT DOCUMENTS

| 3,215,480 | 11/1965 | Marley | 308/121 |
|---|---|---|---|
| 3,328,094 | 6/1967 | Muijderman | 308/160 |
| 3,377,113 | 4/1968 | Wilson | 308/9 |
| 3,382,014 | 5/1968 | Marley | 308/9 |
| 3,434,762 | 3/1969 | Marley | 308/73 |
| 3,439,962 | 4/1969 | Gothberg | 308/9 |
| 3,606,501 | 9/1971 | Waplington | 308/122 |
| 3,809,443 | 5/1974 | Cherubim | 308/9 |
| 3,929,393 | 12/1975 | Marantette et al. | 308/122 |
| 3,951,475 | 4/1976 | Okano et al. | 308/9 |

FOREIGN PATENT DOCUMENTS 1525012 2/1972 Fed. Rep. of Germany .
2616132 10/1978 Fed. Rep. of Germany .

OTHER PUBLICATIONS

Gross, W. A., "Gas Film Lubrication", 1962, pp. 138-141.

*Primary Examiner*—Richard R. Stearns
*Attorney, Agent, or Firm*—Hume, Clement, Brinks, Willian & Olds, Ltd.

[57] ABSTRACT

A gas bearing for textile machine applications includes a rotor having a bearing surface shaped to define a truncated conical bearing surface and a foil shell having a corresponding truncated conical shape. This gas bearing supports both radial and axial loads, and two such bearings may be combined to support axial loads in two directions as well as radial loads.

17 Claims, 4 Drawing Figures

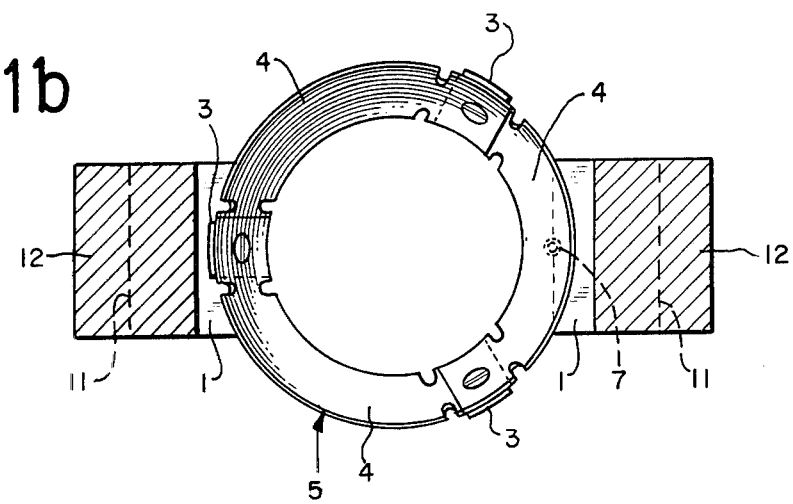
FIG. 1b
FIG. 1a
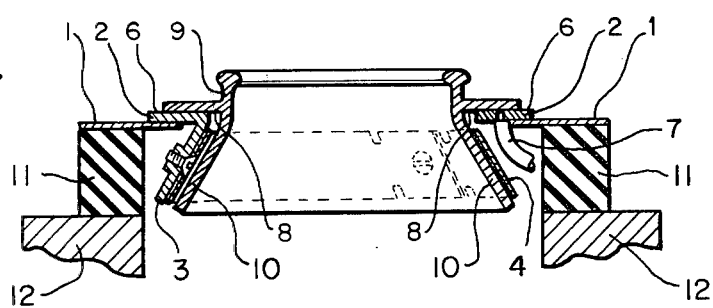
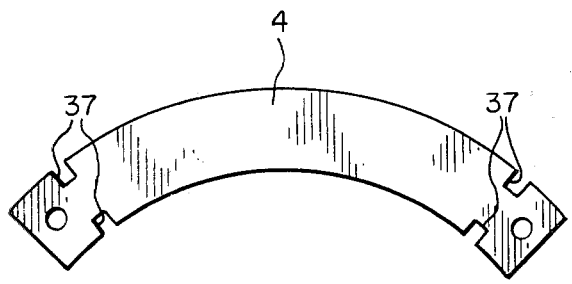
FIG. 3
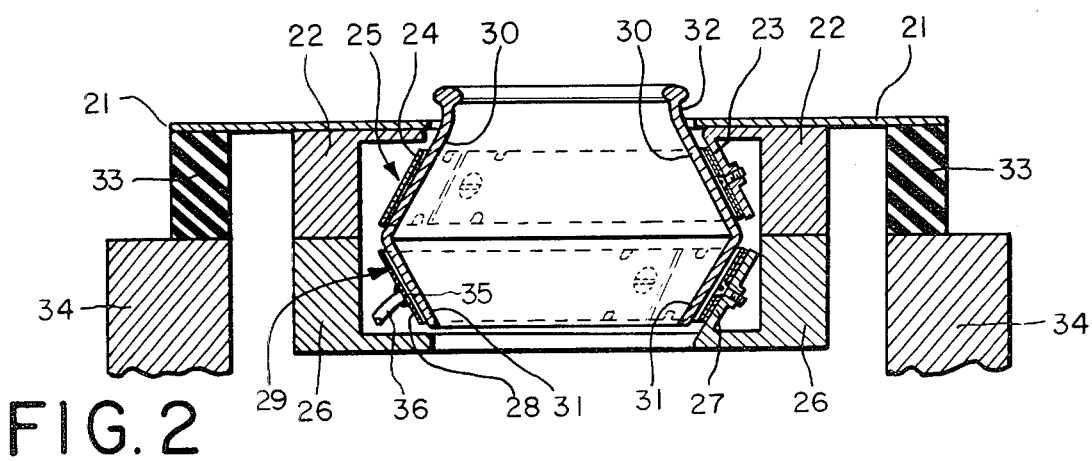
FIG. 2

GAS BEARING

BACKGROUND OF THE INVENTION

This invention relates to gas bearings for rapidly rotating parts on textile machines such as spinning and twisting machines, and, in particular, to gas bearings for spinning rotors, spinning rings and spinning spindles.

Many gas bearings having thin foils as bearing elements have in the past been ill suited to support axial loads. For optimum stability, such gas bearings often require at least one radial foil bearing to support radial loads and two axial bearings to support axial loads. Here each axial bearing supports axial loads in one direction, one axial bearing serving to absorb the weight of the spinning rotor during standstill and during startup.

During the spinning operation when a textile machine is operating at speed the moving thread may often exert axial forces on the rotor in an upward direction, which forces may exceed the weight of the rotor by a considerable amount. In this case, a second axial bearing surface is necessary to bear these upward forces. The carrying capacity of this second axial bearing surface is, however, limited by the oblique position of the rotor, i.e., the axial rotor surface and the axial stator surface at times are not oriented parallel to one another. This oblique positioning of the rotor with respect to the axial stator is often caused by dynamic imbalance of the ring rotor even in the case of an optimally balanced rotor. With conventional gas bearings of the prior art this second axial bearing could be eliminated only if the weight of the rotor could be made greater than the upward-acting axial forces of the thread; in many cases, however, it is not practical to make the rotor so heavy.

SUMMARY OF THE INVENTION

The present invention is directed to a gas bearing for rapidly rotating parts on spinning or twisting machines, which bearing is capable of supporting axial loads in at least one direction. In this way at least one axial bearing may be eliminated. According to this invention a gas bearing is provided with a foil bearing having at least one foil curved to define a portion of a truncated conical shell.

An important advantage of this invention is that both axial and radial loads can be supported by the conical foil bearing of this invention. Thus, with a single conical foil bearing one axial bearing can be eliminated and with two conical foil bearings both axial bearings can be eliminated. Furthermore, the conical foil bearing of this invention will support axial loads even when the rotor tilts from its nominal axis of rotation. In that axial loads can be easily supported, the mass of the rotor can be kept small. This use of a lightweight rotor brings the additional advantage that the rotor may often be started without supplying compressed feed air. Lightweight rotors also make possible rapid acceleration and synchronization of the gas bearing. Furthermore, the low frictional moment makes possible a low thread tension. Through these measures there is provided a particularly simple and economical, long life gas bearing.

The invention, together with further objects and attendant advantages, will best be understood by reference to the following description taken in conjunction with the appended drawings.

BRIEF DESCRIPTION OF THE DRAWINGS

FIG. 1a is a cross sectional view of a first preferred embodiment of the gas bearing of this invention.

FIG. 1b is a plan view from below of the gas bearing of FIG. 1, showing the rotor removed.

FIG. 2 is a cross sectional view of a second preferred embodiment of the gas bearing of this invention.

FIG. 3 is a plan view of a foil for the gas bearing of either FIG. 1a or FIG. 2.

DETAILED DESCRIPTION OF PREFERRED EMBODIMENTS

Referring now to the drawings, FIGS. 1a and 1b show a first preferred embodiment of the gas bearing of the present invention including a conical foil bearing and a single axial bearing. This bearing includes a base plate 1 to which is fastened a stator 2. Three foils 4 are symmetrically mounted to the stator 2 by means of fastening elements 3 so as to define a downwardly opening truncated conical shell 5. The stator 2 defines an axial bearing surface 6 above the conical shell 5. Nozzles 7 are provided in the stator 2 through which compressed air is fed during the starting phase. On this bearing surface 6 of the stator 2 there is borne an axial bearing surface 8 of a rotor 9, the bearing surfaces 6 and 8 together forming an axial bearing. The axial bearing surface 8 of the rotor 9 includes spiral grooves (not shown) for the aerodynamic formation of an air cushion during operation. Underneath the axial bearing surface 8 the rotor 9, internally hollow, has a downward-opening truncated conical shell surface 10. The three foils 4 are placed against the surface 10 without bias tension, forming the truncated conical shell 5. The base plate 1 is mounted by means of a damping element 11 to a casing 12.

During startup compressed air is introduced via the nozzles 7 between the bearing surface 8 and the bearing surface 6 of the stator 2. This compressed air builds up an aerostatic gas cushion to reduce startup friction. Preferably, the flow of compressed air is terminated when the rotor 9 reaches a predetermined speed, for at that point the spiral grooves in the bearing surface 8 of the rotor 9 will have built up an aerodynamic gas cushion between the bearing surface 6 of the stator 2 and the bearing surface 8 of the rotor 9.

Similarly, at a certain speed of the rotor 9 an aerodynamic gas cushion will be formed between the truncated conical shell 5 of the stator 2 and the truncated conical shell surface 10 of the rotor 9. This gas cushion acts to provide a low friction bearing for the upwardly directed axial forces applied to the rotor 9 by the spinning thread (not shown). Of course, the truncated conical foil bearing formed by the truncated conical shell 5 of the stator 2 and the truncated conical shell surface 10 of the rotor 9 also acts to absorb radial forces applied to the rotor 9 by both the tension of the thread and the imbalance of a ring rotor (not shown). Furthermore, the foil bearing of FIGS. 1a, 1b absorbs upwardly-directed axial forces even when the rotor 9 is tilted from its nominal axis of rotation.

A second preferred embodiment of the gas bearing of this invention is represented in cross section in FIG. 2. This embodiment includes two opposed truncated conical foil bearings. Referring to FIG. 2, an upper stator 22 is mounted to a base plate 21. Three fastening elements 23 serve to mount three symetrically arranged foils 24 to the stator 22. These foils 24 define a downwardly-opening truncated conical shell 25. To the upper stator 22 there is attached a lower stator 26, on which, by means of three fastening elements 27, three foils 28 are symmetrically arranged, which foils define an upward-opening truncated conical shell 29. The foils 24,28 serve to define two opposed truncated conical shells 25,29 having adjacent base openings. These shells 25,29 surround two truncated conical shell surfaces 30,31 of an internally hollow rotor 32 substantially without bias tension. The base plate 21 is mounted by means of a damping element 33 to a casing 34. The embodiment of FIG. 2 is well suited for use with a lightweight rotor 32. To facilitate starting of the rotor 32 the foils 28 forming the lower truncated conical shell 29 preferably define fine bores 35, through which compressed air is supplied to the foils 28 by means of hoses 36 glued to the foils 28. Preferably, the supply of compressed air is shut off at a certain speed of the rotor 32, for then an aerodynamic gas cushion will have formed between the truncated conical shell 29 of the lower stator and the truncated conical shell surface 31 of the rotor 32.

The foils 4,24,28 may be formed of any suitable material, such as metal or plastic, for example. These foils may be formed either as straight strips or, as shown in FIG. 3, as flattened strips taken from the truncated conical shells 5,25,29 which correspond to the truncated conical shell surfaces 10,30,31 of the rotor 9,32. Notches 37 are formed at both ends of the foils 4,24,28 to create weak places at which rotation is possible. These notches 37 enable the foils 4,24,28 to conform themselves more closely to the truncated conical shell surfaces 10,30,31 of the rotor as the rotor tumbles so that a uniform air gap and thereby a uniformly carrying gas cushion is created between the foils 4,24,28 and the truncated conical shell surfaces 10,30,31 of the rotor 9,32.

An important advantage of this invention is that only two bearing surfaces are required to support axial loads, even during tumbling of the rotor 9,32. Since the mass of the rotor 9,32 can be small, the rotor 9,32 can generally be started without supplying compressed air. The low mass of the rotor 9,32 further makes possible a rapid acceleration to full speed and synchronization of the rotor 9,32 and the low frictional moment results in a low thread tension. Thus, the present invention provides an especially simple, economical, and long life gas bearing.

Of course, it should be understood that various changes and modifications to the preferred embodiments described herein will be apparent to those skilled in the art. Such changes and modifications can be made without departing from the spirit and scope of the invention, and without diminishing its attendant advantages. It is, therefore, intended that such changes and modifications be covered by the following claims.

I claim:

1. A gas bearing for rapidly rotating parts in spinning and twisting textile machines, said bearing comprising:
    a rotor having a first bearing surface shaped to define a truncated, substantially conical surface;
    a first bearing foil shell mounted adjacent the first bearing surface, said foil shell shaped to define a truncated, substantially conical surface, said foil shell including at least one foil having first and second ends, each of which is provided with a weakened portion.

2. The gas bearing of claim 1 wherein the first foil shell, when oriented in its operational position, includes a larger diameter directed downwardly and a smaller diameter directed upwardly.

3. The gas bearing of claim 1 further including a second foil bearing shell shaped to define a truncated, substantially conical surface, said second shell mounted coaxially with said first shell, wherein said rotor includes a second bearing surface shaped to define a truncated, substantially conical surface adjacent the second foil bearing shell.

4. The gas bearing of claim 1 or 2 wherein the first foil bearing shell includes three foils arranged to form a downwardly opening truncated conical shell.

5. The gas bearing of claim 3 wherein each of the first and second foil bearing shells comprises three foils arranged to form a truncated conical shell.

6. The gas bearing of claim 1 or 3 wherein at least one of the foil shells is mounted against the rotor free of bias tension.

7. The gas bearing of claim 1 or 3 wherein at least one of the foil bearing shells comprises a plurality of individual foils and the foils are formed as straight strips.

8. The gas bearing of claim 1 or 3 wherein at least one of the foil bearing shells comprises a plurality of individual foils and the foils are formed as sections of truncated conical shells.

9. The gas bearing of claim 1 wherein each of the ends of the at least one foil defines a pair of opposed notches which act to form the respective weakened portion.

10. The gas bearing of claims 1 or 3 wherein said at least one foil is formed of metal.

11. The gas bearing of claims 1 or 3 wherein said at least one foil is formed of plastic.

12. The gas bearing of claim 1 or 3 wherein at least one foil bearing shell includes a plurality of foils, and the bearing further includes means for mounting said plurality of foils to form said at least one shell.

13. A gas bearing for rapidly rotating parts in textile machines, said bearing comprising:
    a rotor having a first bearing surface shaped to define a truncated, substantially conical surface;
    a bearing foil shell mounted adjacent the first bearing surface, said foil shell shaped to define a truncated, substantially conical surface, said foil shell defining a plurality of weakened portions spaced around the foil shell, said weakened portions acting to increase the flexibility of the foil shell and thereby to improve the extent to which the foil shell conforms to the bearing surface of the rotor.

14. The gas bearing of claim 13 wherein said foil shell defines a plurality of notches, each of which is included in a respective one of the weakened portions.

15. The gas bearing of claim 13 wherein the foil shell comprises:
    a plurality of foil support surfaces;
    a plurality of foils mounted to the support surfaces to extend therebetween, said foils cooperating to define the truncated, substantially conical surface;
    each of said foils defining a pair of spaced notches, and each of said pairs of spaced notches acting to weaken the respective foil at a respective one of the weakened portions.

16. The gas bearing of claim 15 wherein the plurality of foils includes three foils and each of said foils defines two sets of opposed notches.

17. A gas bearing for rapidly rotating parts in textile machines, said bearing comprising:

a rotor having a first bearing surface shaped to define a truncated, substantially conical surface;

three foil support surfaces mounted adjacent the bearing surface of the rotor;

three foils, each foil mounted to a respective pair of foil support surfaces such that the three foils cooperate to define a foil shell shaped to define a truncated, substantially conical surface which matches the configuration of the first bearing surface of the rotor;

each of said foils defining two spaced pairs of opposed notches, each pair of opposed notches positioned adjacent a respective one of the bearing surfaces, each pair of opposed notches acting to form a weakened portion of the respective foil, thereby increasing the flexibility of the respective foil and improving the extent to which the foils conform to the first bearing surface of the rotor.

* * * * *